(No Model.)
G. SYMONS.
DEVICE FOR SEPARATING LIQUID FROM GAS.
No. 545,550. Patented Sept. 3, 1895.
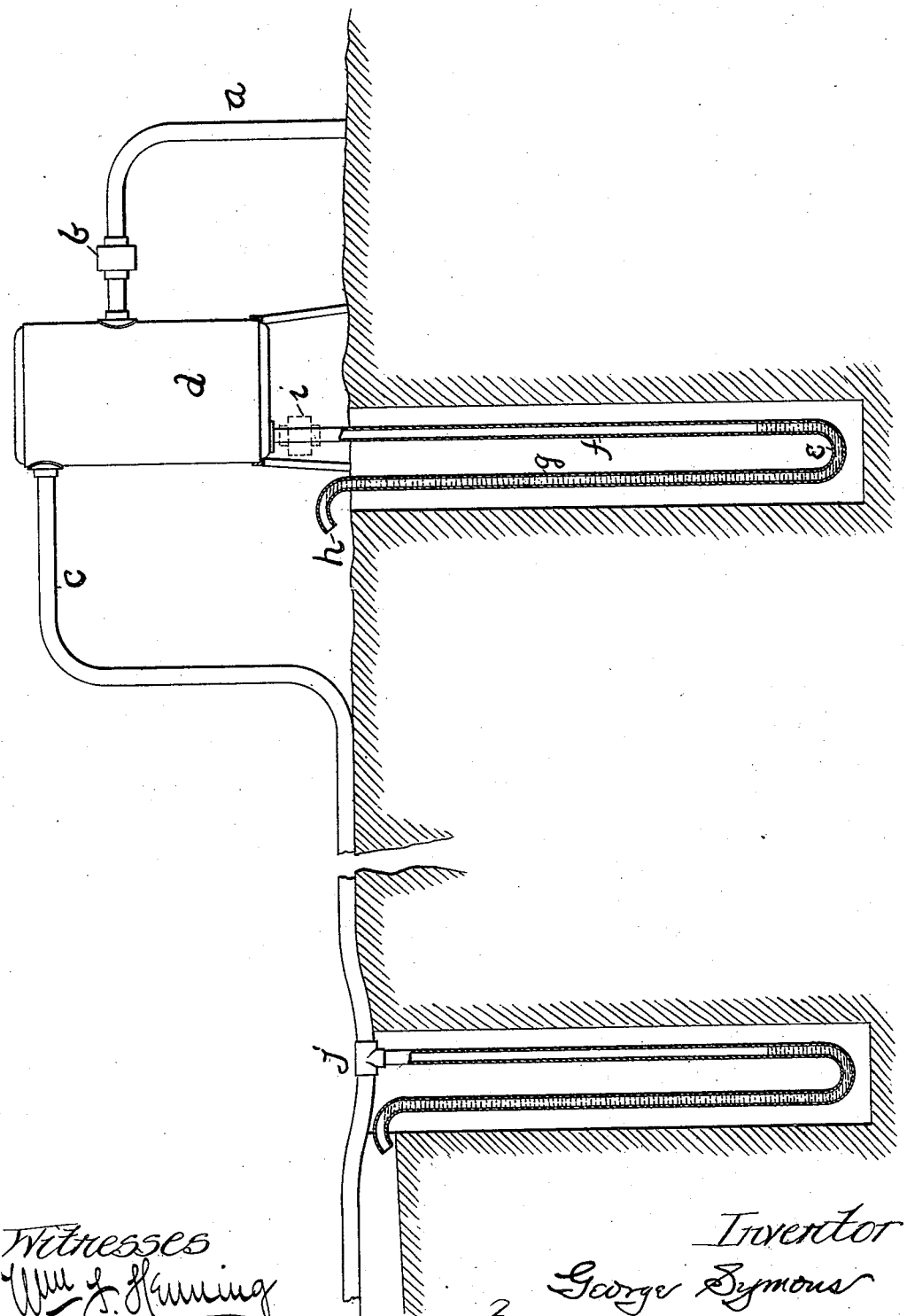

UNITED STATES PATENT OFFICE.

GEORGE SYMONS, OF SHERIDAN, INDIANA.

DEVICE FOR SEPARATING LIQUID FROM GAS.

SPECIFICATION forming part of Letters Patent No. 545,550, dated September 3, 1895.

Application filed January 17, 1895. Serial No. 535,191. (No model.)

*To all whom it may concern:*

Be it known that I, GEORGE SYMONS, a citizen of the United States, residing at Sheridan, in the county of Hamilton, State of Indiana, have invented a certain new and useful Improvement in Devices for Separating Liquids from Gas, of which the following is a full, clear, and exact description, reference being had to the accompanying drawing, forming part of the same.

The object of my invention is to provide an apparatus for separating liquids from gas which shall be automatic in its operation, not liable to get out of order, and may be cheaply constructed. It is particularly adapted for separating liquid from natural gas, which frequently comes from the well surcharged with water or oil, which it is essential should be removed before consumption.

My device is adapted to be used either at the well or at any point in the distribution.

It consists in the combination, with a tank or pipe through which gas passes at a pressure not greater than a certain predetermined maximum, of a U-shaped pipe extending downwardly therefrom to a depth such that the weight of a column of drained liquid in one arm of the U-pipe shall be greater than the predetermined maximum pressure of the gas per area equivalent to the cross-section of said arm of the U-pipe.

The drawing illustrates my device used for removing water or oil from natural gas and shows it both near the well and at a point farther along in the distribution-pipe. The gas comes from the well through the main pipe $a$. If it is to be consumed near the well, it passes immediately through the regulator $b$, which reduces the pressure to, say, two or three pounds per square inch and governs it very accurately. In speaking herein of the pressure of the gas I mean the pressure above the atmosphere and not the absolute pressure above a vacuum. Instead of allowing the gas to flow directly from the regulator into the supply-pipe $c$ I prefer to interpose a receiving-tank $d$. Extending downward from the bottom of the receiving-tank into the earth is the U-shaped pipe $e$. The liquid from the well collects in the tank $d$ and passes by gravity, assisted by the pressure of the gas, down the arm $f$ and up the arm $g$ and flows out of the orifice $h$. After the liquid has discharged itself from the tank to the level of the orifice of the U-pipe the pressure of the gas forces it down the arm $f$ and out of the orifice until the weight of that part of the column of liquid in the arm $g$ which is above the level of the liquid in the arm $f$ balances the pressure of the gas. This state of equilibrium will, of course, take place when the weight of the said column is equal to the pressure above the atmospheric of the gas on an area equivalent to the section of the U-pipe, or the arm $g$ thereof, if the size should vary, the pressure of the air upon the liquid in the outer arm of the U-pipe being, of course, balanced by an equal pressure of the gas upon the liquid in the inner arm. Liquid collecting after equilibrium is established will pass down the arm $f$ and a corresponding amount will be discharged from the orifice $h$. Thus the liquid will always be discharged from the tank irrespective of the length of the U-pipe, and if the arm $g$ is of such a length that the column of liquid in it will balance the allowable maximum pressure there will be no escape of gas until that maximum is exceeded. If the maximum pressure is three pounds per square inch and the liquid is water, a U-pipe having an arm seven feet long will accomplish the result. If the liquid is oil, the pipe must be correspondingly longer. Any added length beyond that absolutely required is no detriment, and, therefore, to provide for emergencies I prefer to make the pipe somewhat longer than required for operation.

If the gas is to be forced a long way before consumption, requiring the full well-pressure of the gas, so that the regulator $b$ is not used, I insert a regulator $i$ in the upper part of the U-pipe. This allows the U-pipe to be of moderate length, although the pressure in the tank and pipes is high. Should it be desired to drain any of the distributing-pipes at low points, as $j$, where liquid is liable to collect, the U-pipe may be there attached, its operation being the same. As the orifice of the U-pipe is below the level of the tank or distribution pipe, the U-pipe will operate to drain the latter by gravity when the flow of the gas is shut off, the external air-pressure being in this case balanced by the static pressure of the gas or by air admitted to the tank or pipes.

The liquid in the lower portion of the U-pipe is prevented from freezing by the earth surrounding it, and the upper portion may be protected, if desired, by gas-gets burning against it.

Other useful expedients—as, for example, troughs for carrying off the liquid and devices for separating oil and water drawn off—will readily suggest themselves.

Having thus described my invention, what I claim as new, and desire to secure by Letters Patent, is—

1. In a device for separating liquid from gas, the combination, with a tank or pipe having gas therein at a pressure less than a predetermined maximum, of a U-shaped pipe extending downward from said tank or pipe and of such length that the weight of a column of the liquid intended to be separated contained in the discharge arm of said U-pipe shall be at least as great as the said maximum pressure of the gas in said tank or pipe upon an area equivalent to the working cross section of said arm of the U-pipe, for the purpose specified.

2. In an apparatus for separating liquid from natural gas, the combination with a natural gas well of a pipe leading therefrom, a regulator in said pipe, and a U-shaped pipe beyond the regulator extending downward to such a depth that the weight of a column of the liquid intended to be separated contained in the discharge arm of said U-pipe shall be at least as great as the gas-pressure per similar area maintained by said regulator, for the purpose specified.

3. In a device for separating liquid from gas, in combination, a supply pipe $a$, a receiving tank $d$, a regulator $b$ located between said supply pipe and tank, a discharge pipe $c$ adapted to convey the gas from said receiving tank, and a U-shaped pipe $e$ extending downward from said tank to such a depth that the weight of a column of the liquid intended to be separated contained in the discharge arm of said U-pipe shall be at least as great as the pressure per similar area of the gas within the tank, substantially as described.

GEORGE SYMONS.

Witnesses:
H. A. ENDALY,
D. J. MCMATH.